Figure 1:
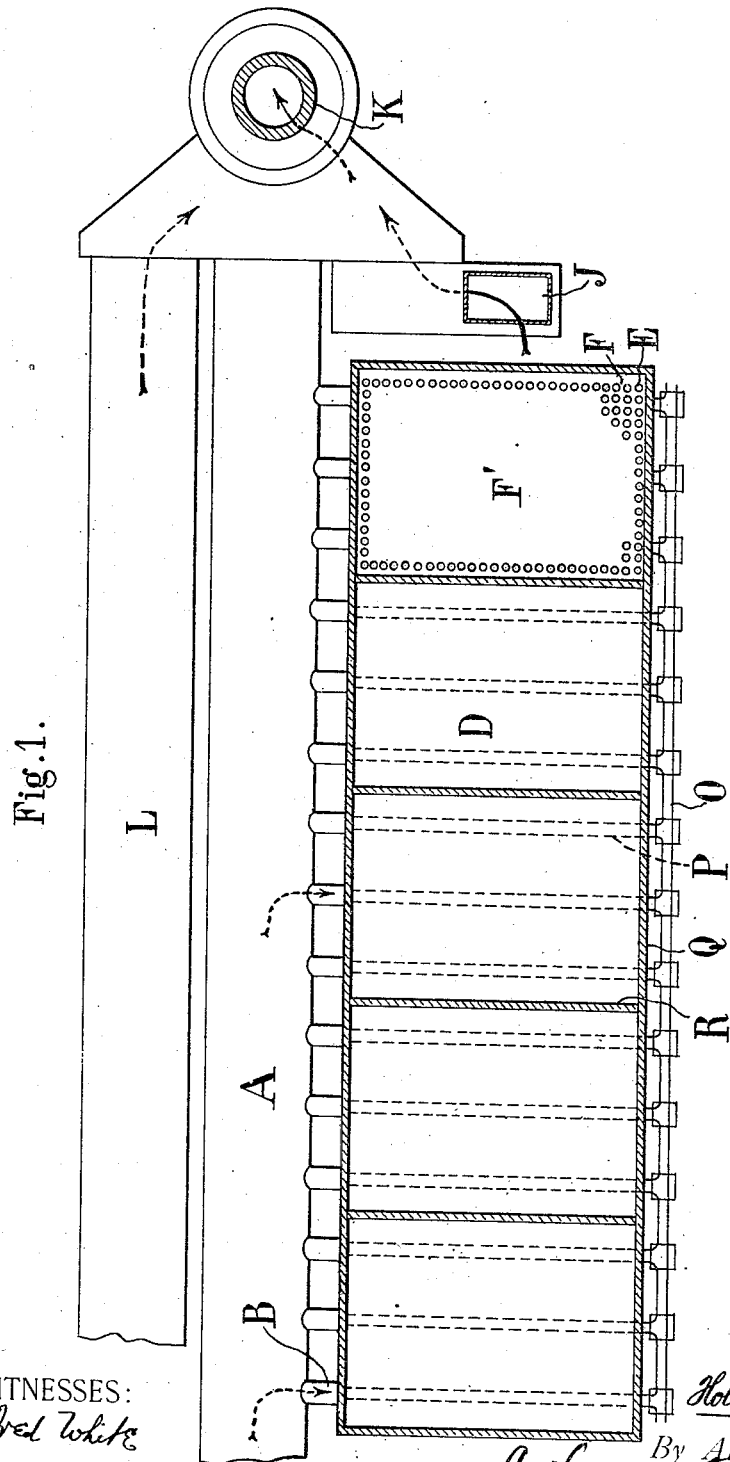

H. E. BENEDICT.
BAG HOUSE.
APPLICATION FILED OCT. 5, 1907.

898,426.

Patented Sept. 15, 1908.

6 SHEETS—SHEET 2.

WITNESSES:
Fred White
René Bruine

INVENTOR :
Holland E. Benedict,
By Attorneys,

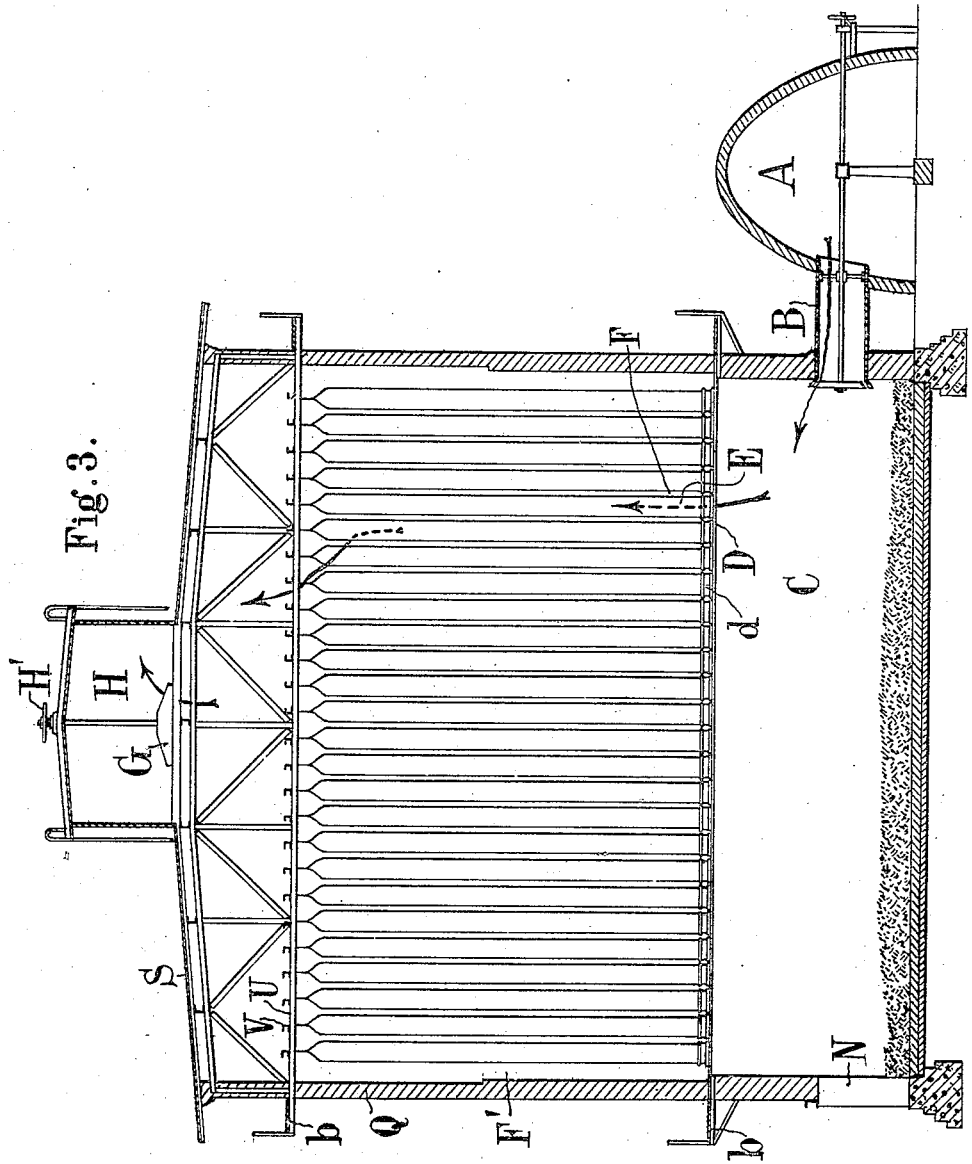

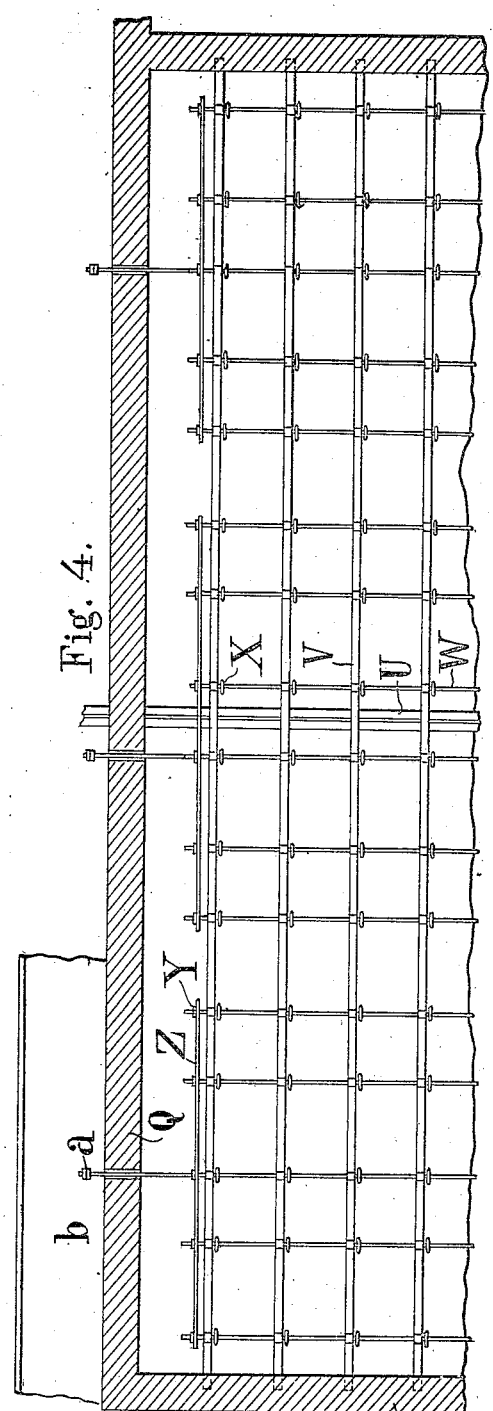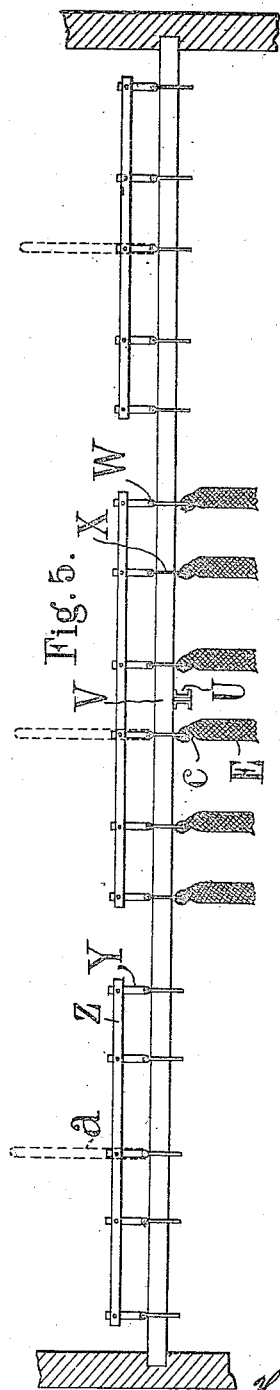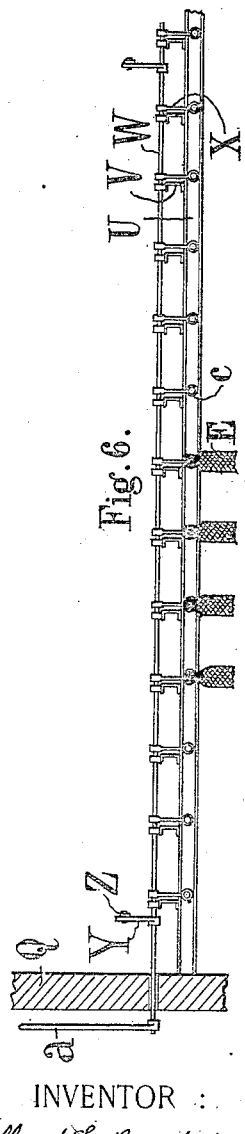

H. E. BENEDICT.
BAG HOUSE.
APPLICATION FILED OCT. 5, 1907.

898,426.

Patented Sept. 15, 1908.
6 SHEETS—SHEET 5.

WITNESSES:
Fred White
René Quine

INVENTOR:
Holland E. Benedict,
By Attorneys
Arthur C. Fraser & Usina

H. E. BENEDICT.
BAG HOUSE.
APPLICATION FILED OCT. 5, 1907.
898,426.
Patented Sept. 15, 1908.
6 SHEETS—SHEET 6.
Fig. 12.
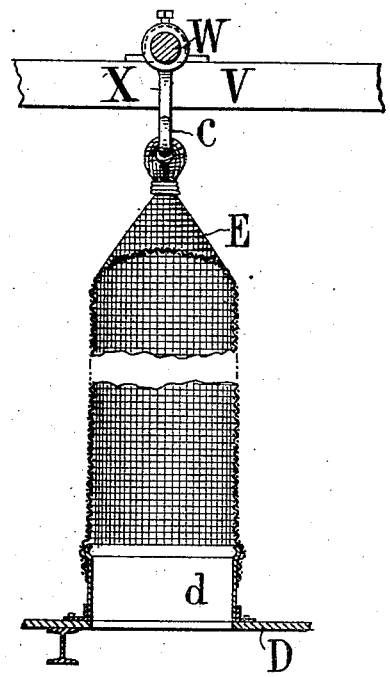
Fig. 12.ª
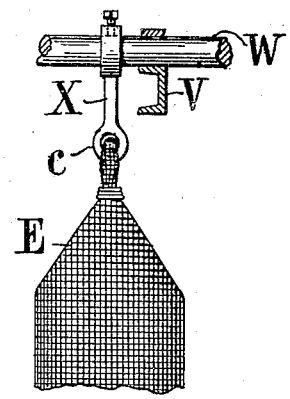
Fig. 14.
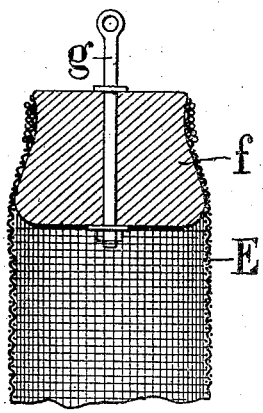
Fig. 13.
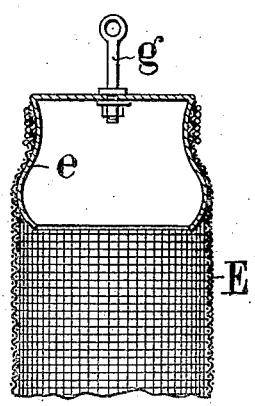
WITNESSES:
Fred White
René Bruine
INVENTOR:
Holland E. Benedict,
By Attorneys,
Arthur C. Fraser & Usina

UNITED STATES PATENT OFFICE.

HOLLAND E. BENEDICT, OF SALT LAKE CITY, UTAH, ASSIGNOR TO UNITED STATES SMELT-
ING, REFINING & MINING COMPANY, OF SALT LAKE CITY, UTAH, A CORPORATION OF
MAINE.

BAG-HOUSE.

No. 898,426.  Specification of Letters Patent.  Patented Sept. 15, 1908.

Application filed October 5, 1907. Serial No. 396,047.

*To all whom it may concern:*

Be it known that I, HOLLAND E. BENE-
DICT, a citizen of the United States, residing
at Salt Lake City, in the county of Salt Lake
and State of Utah, have invented certain new
and useful Improvements in Bag-Houses, of
which the following is a specification.

Fume discharges from blast furnaces are
usually carried through a dust chamber in
which the heavier dust settles out; the bal-
ance of the suspended material and the fume
being then forced through a bag house to
filter out the finely divided and suspended
material before the fume is finally discharged
into the stack.

This invention provides certain improve-
ments in such bag houses, and in apparatus
for shaking down bags used in this and simi-
lar locations.

The bag house is provided with a floor
which divides it into one or more bag rooms
above, and dust cellars below. The bags are
usually of muslin or woolen and arranged in
the bag rooms with their upper ends closed
and their lower ends communicating through
the floor with the dust cellar. The dust-
laden fume is conducted into the cellar, and
thence up through the open lower ends of
the bags, and passes through the mesh of the
bags, the dust being filtered out in such pas-
sage. From the space surrounding the bags
in the bag room the filtered fume is conduct-
ed by an outlet flue to the stack. It is nec-
essary to shake the bags from time to time,
usually once a day, so that the dust adhering
to the inside of these will drop to the floor of
the dust cellars, the bags being shaken by a
man who enters the bag room for the pur-
pose. The man who shakes the bags must
be well protected from the fumes. Accord-
ing to the general practice at present, he
wears a rubber suit, and over his head a hel-
met carrying a supply of compressed air for
him to breathe.

According to this invention a mechanical
arrangement is provided whereby the bags
may be shaken more efficiently than by hand
and from the outside of the room, so that it
is not necessary to open to the atmosphere
the room in which the bags are being shaken.
The apparatus also permits of the shaking of
a large number of bags at once, thereby sav-
ing much time. A very efficient movement
is given to the bags by shaking them at the
top with a wavy motion which travels from
top to bottom and frees the dust much better
than the motion imparted by the hand shak-
ing by a man on the floor. The bags being
rigidly tied at the bottom, it is difficult to
shake them well from a point near the bot-
tom.

The accompanying drawings illustrate an
embodiment of the invention.

Figure 2:
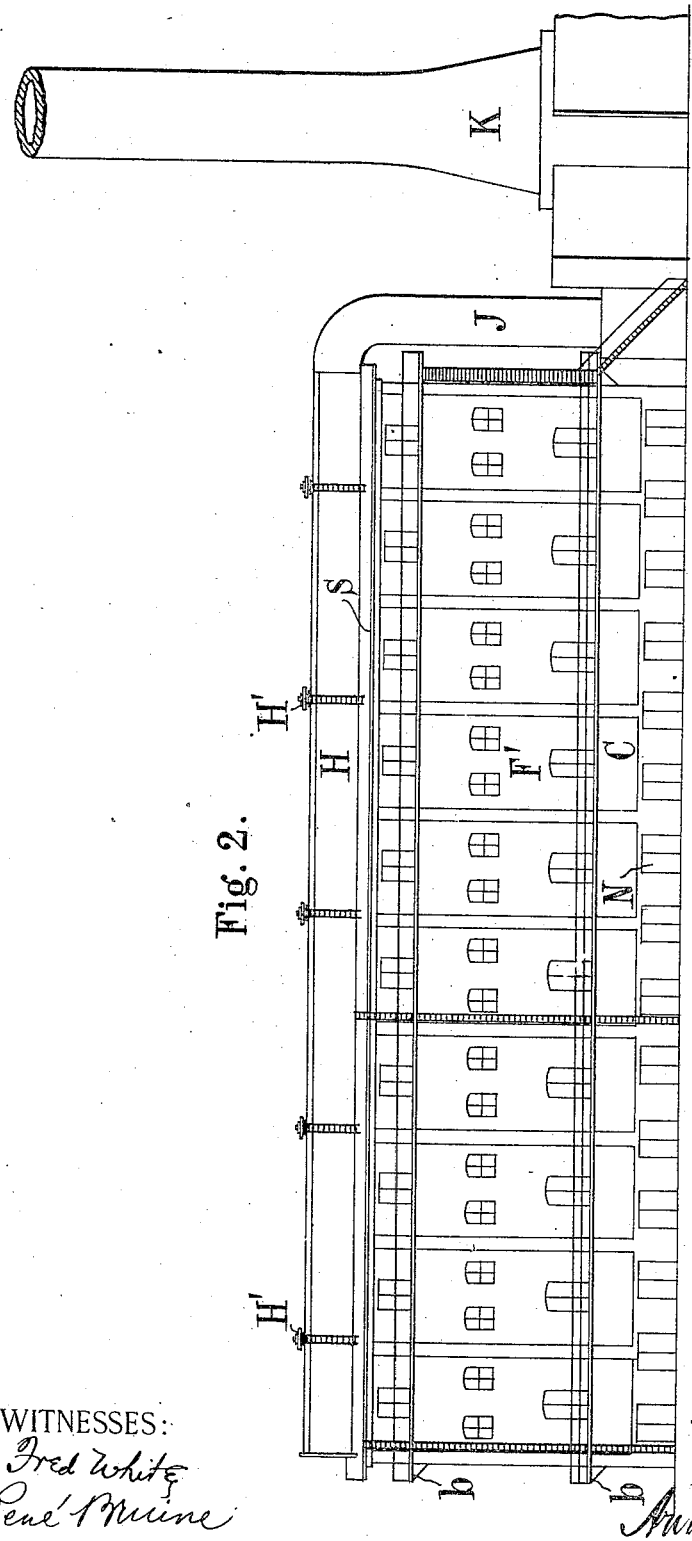
Figure 7:
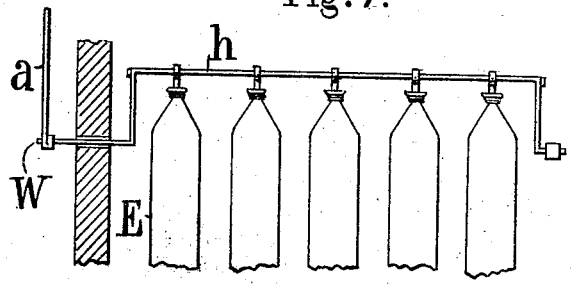
Figure 8:
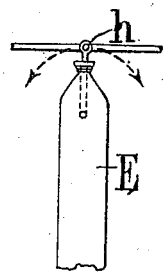
Figure 9:
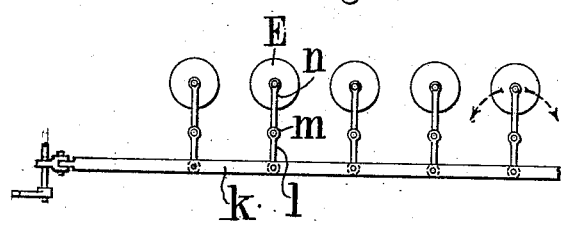
Figure 10:
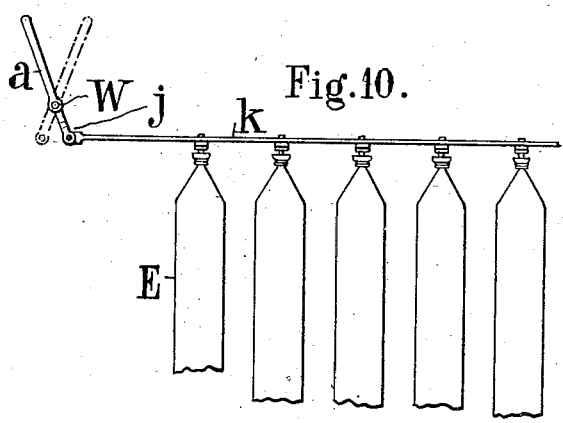
Figure 11:
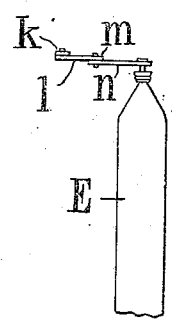

Figure 1 is a plan and horizontal section,
and Fig. 2 an elevation of a complete bag
house with flues and stack connected there-
to; Fig. 3 is a transverse section through the
bag house and adjacent flues; Figs. 4, 5 and 6
are respectively a plan, and a transverse and
a longitudinal section of a part of the shaking
apparatus; Figs. 7 and 8 are diagrammatic
side and end views of a different style of
shaker embodying the invention; Figs. 9,
10 and 11 are respectively a diagrammatic
plan, side elevation and end elevation of
another arrangement of the shaking appa-
ratus; Fig. 12 is an enlarged sectional view
of one of the bags and its top and bottom
connections, Fig. 12ª being a view of the up-
per connection at right angles to Fig. 12;
Figs. 13 and 14 are enlarged details of the
upper ends of the bags slightly modified.

Referring now to the embodiment of the
invention illustrated, the fume enters by way
of the flue A and passes by way of a number
of valved branches B to the different sections
of the dust cellar C, and thence up through
the steel "thimble" floor D into the bottoms
of the bags E, after passing through the
meshes of which it escapes into the outer
space F of the bag room F′, between the bags,
and thence by way of valves G operated by
outside hand wheels H′ into an outlet flue H
running along the center of the roof of the
bag house, and thence by way of a down-
coming flue J to the stack K. An additional
flue L may be provided for carrying fumes
directly to the stack without passing through
the bag house.

Doors N are provided for the several sec-
tions of the dust cellar and at the side oppo-
site the inlet flue, and a track O may be ar-
ranged to run along the front of the house
with branches P running into the several dust
cellars for conveniently handling the dust.
The bag rooms are surrounded by masonry
outer walls Q and partition walls R, and a
roof S preferably of asbestos composition.
The house is divided in the present case for
example into five rooms, and the dust cellar of each room is divided into three sections by means of partitions parallel with the partitions R. Thus the bags may be shaken or the dust may be taken out from parts of the house without interfering with the operation of the other parts. Each room preferably carries a large number of bags, and these bags are quite high. For example the rooms shown may be provided each with about 400 bags 30 feet high. It will be appreciated that the efficient shaking of such bags by a man standing on the floor D is difficult, and that the arranging of the shaking apparatus so that a single lever operates a number of bags, very much facilitates the operation.

The bags may be mounted in various ways. In the arrangement shown their upper ends are supported by the lower chords U of the roof trusses. A number of transverse beams, such as the channels V, are supported upon the chords U and upon the walls of the building, as shown best in Figs. 4, 5 and 6, and upon these transverse beams are supported in suitable bearings a number of shafts W provided with depending arms X, to the lower ends of which bags are fastened. The shafts W are connected in groups by means of upwardly extending arms Y, to the upper ends of which is connected for each group a horizontal bar Z. By reason of this connection the oscillation of one of the shafts results in a corresponding oscillation of all the shafts in the same group. One shaft in each group is accessible from the outside, as by running the end of the shaft through the wall Q of the building, and providing it on its outer end with a handle $a$. Galleries $b$ extend along the outside of the building to give access to the several handles $a$. The oscillating shafts which pass through the walls of the building are preferably made to do so with a close fit, and if necessary a stuffing box may be used to make a seal.

The bags may be conveniently connected to the arms X by providing the ends of these arms with loops $c$ through which the ends of the bags may be passed, and bent back on each other and tied as in Fig. 12. The connections of the lower ends of the bags are preferably made by means of steel thimbles $d$ about which the lower ends of the bags are tied, and which thimbles are bolted to the floor D.

The connections of the upper ends of the bags may be modified as in Figs. 13 and 14 by tying the end of each bag around a thimble $e$ of metal, or $f$ of wood, and by attaching an eye $g$ to the thimble so as to conveniently fasten over a hook on the lower end of one of the arms X.

The arrangement of the arms and connections shown in Figs. 4, 5 and 6 has material advantages in the way of simplicity and durability, and effects a very advantageous method of shaking the bags. Each bag as its supporting arm X swings from side to side is lowered and lifted, and at the same time swung sidewise. The bag thus receives a wavy motion which shakes the dust well out of any transverse creases or pockets. A similar effect is obtainable from the arrangement shown in Figs. 7 and 8. Here the rotary shaft W is supported upon the wall or upon transverse or longitudinal beams, and is provided with an offset portion $h$ to which the several bags E of a group are connected, so that as the shaft W is swung a vertical and also a horizontal movement is obtained similar to that produced by the arms X of the previously described construction.

In the arrangement shown in Figs. 9, 10 and 11, a shaft W is oscillated by the outside handle $a$, and is provided within the house with an arm $j$ which operates a horizontal bar $k$ pivoted to the ends of arms $l$ upon vertical shafts $m$ lying at the side of or eccentric with the vertical axes of the bags, and provided with arms $n$ which are connected to the bags. The operation of this shaking apparatus draws the bag taut at its upper end as said upper end is swung out of vertical line with its lower end and effects a vertical movement of at least the slack lower end of the bag; and this vertical movement combined with the horizontal movement, produces substantially the same effect as the previously described constructions.

The attaching of the top of the bag to the end of an arm on an oscillating shaft in the manner shown, is designed to effect chiefly a horizontal wavy motion which will travel from the top to the bottom of the bag and shake it out very effectively and without the strain that would accompany a simple vertical reciprocation of the top of the bag. The vertical arrangement of the arm described in Figs. 4 to 8, is especially efficient in securing this wave motion, like the motion produced in a length of rope when shaken at one end.

What I claim is:—

1. A bag house for filtering suspended material from fumes, having a floor dividing it into a bag room above and a dust cellar below, and having substantially air-tight walls and roof for said bag room, an outlet flue for the filtered fumes communicating with said bag room, bags having upper closed ends and lower open ends communicating through said floor with said dust cellar, an inlet flue for the dust-laden fumes communicating with said dust cellar, a series of shafts extending across the upper part of the room, depending arms on said shafts having their lower ends bent to form loops in which the upper ends of the bags are attached, and means outside of the room for turning said shafts to shake the bags.

2. An apparatus for shaking bags including in combination a series of shafts, and arms on said shafts having loops at their ends through which the ends of the bags may be passed and folded.

3. An apparatus for shaking bags including in combination a shaft, means for oscillating the same, and an arm on said shaft having a substantial amount of horizontal movement as the shaft is oscillated and connected to the upper part of the bag, so as to shake the bag with a horizontal wavy motion.

4. An apparatus for shaking bags including in combination a shaft, means for oscillating the same, and a substantially vertical arm on said shaft and connected to the upper part of the bag so as to shake the bag with a horizontal wavy motion.

In witness whereof, I have hereunto signed my name in the presence of two subscribing witnesses.

HOLLAND E. BENEDICT.

Witnesses:
  H. C. STEVENS,
  C. F. MOORE.